(12) United States Patent
Tennyson, Jr.

(10) Patent No.: US 6,290,844 B1
(45) Date of Patent: Sep. 18, 2001

(54) FILTER SYSTEMS AND METHODS FOR POND WATER PUMP SYSTEMS

(76) Inventor: Irven H. Tennyson, Jr., 20226 English Rd., Mt. Vernon, WA (US) 98274

( * ) Notice: Subject to any disclaimer, the term of this patent is extended or adjusted under 35 U.S.C. 154(b) by 0 days.

(21) Appl. No.: 09/496,940

(22) Filed: Feb. 2, 2000

(51) Int. Cl.[7] .................................................. A01K 63/04
(52) U.S. Cl. ...................... 210/169; 210/170; 210/416.2; 210/483; 210/767; 119/259
(58) Field of Search .................... 210/162, 163, 210/169, 170, 195.1, 232, 249, 416.2, 483, 485, 451, 747, 767; 119/259

(56) References Cited

U.S. PATENT DOCUMENTS

| | | | |
|---|---|---|---|
| 3,662,889 | * | 5/1972 | Takarabe ............................ 210/169 |
| 4,684,462 | * | 8/1987 | Augustyniak ....................... 210/169 |
| 5,306,421 | * | 4/1994 | Weinstein ........................... 210/169 |
| 5,584,991 | * | 12/1996 | Wittstock et al. ................... 210/170 |
| 5,849,198 | * | 12/1998 | Sharpless ............................ 210/163 |
| 6,054,045 | * | 4/2000 | Wittstock et al. ................... 210/169 |

FOREIGN PATENT DOCUMENTS

| | | | |
|---|---|---|---|
| 3228205 A | * | 2/1984 | (DE) . |
| 57-201508 A | * | 12/1982 | (JP) . |
| WO 9940781 A1 | * | 8/1999 | (WO) . |

* cited by examiner

Primary Examiner—David A. Simmons
Assistant Examiner—Frank M. Lawrence
(74) Attorney, Agent, or Firm—Michael R. Schacht; Hughes & Schacht, PLLC

(57) ABSTRACT

A filter system for a pond system. The pond system comprises a pump vault arranged such that unfiltered water in a pond flows into the pump vault, a pump, and a pump vault cover. The filter system comprises filter material adapted to remove impurities from unfiltered water to obtain filtered water and a frame structure connected to the pump vault cover for suspending the filter material within the pump vault. With this arrangement, unfiltered water first passes through the filter material before entering the pump. The filter material is removed from the pump vault for replacement and/or cleaning by removing the pump vault cover from the pump vault.

11 Claims, 2 Drawing Sheets

FILTER SYSTEMS AND METHODS FOR POND WATER PUMP SYSTEMS

TECHNICAL FIELD

The present invention relates to systems and methods for filtering water in pond water pump systems and, more specifically, to filter systems and methods for filtering pond water entering a pump housing.

BACKGROUND OF THE INVENTION

Residential and commercial gardens often include ponds as part of the landscaping. These ponds are designed and constructed to look as natural as possible, but often are placed at locations where natural conditions for supporting a healthy pond are not found. Accordingly, pumps, filters, aerators, and the like are employed to support the healthy functioning of the pond. This type of pond will be referred to herein as an "artificial pond".

Commonly, artificial ponds include a pump housing or vault that is arranged adjacent to the pond such that water flows by gravity from the pond into the pump vault. A pump is located in the pump vault to pump water within the pump vault into an aerator, such as waterfall or fountain, that reintroduces the water back into the pond. The constant circulation of the water by the pump through the aerator promotes a healthy environment in the pond.

Often, filters are arranged within the pump vault to filter leaves and other debris from the water entering the pump vault. Conventionally, these filters are supported on ledges or the like within the pump vault such that water flowing through the pump vault first passes through the filter before entering the pump.

The present invention relates to improved systems and methods for filtering water flowing through a pump vault.

SUMMARY OF THE INVENTION

A filter system for a pond system comprising a pump vault arranged such that unfiltered water in a pond flows into the pump vault, a pump, and a pump vault cover. The filter system comprises filter material adapted to remove impurities from unfiltered water to obtain filtered water and a frame structure connected to the pump vault cover for suspending the filter material within the pump vault. With this arrangement, unfiltered water first passes through the filter material before entering the pump. The filter material is removed from the pump vault for replacement and/or cleaning by removing the pump vault cover from the pump vault.

The present invention may also be implemented as a method of filtering water in a pond. This method would comprise the steps of arranging a pump vault adjacent to the pond such that unfiltered water within the pond enters the pump vault. A pump vault cover is provided, and a pump is arranged within the pump vault. A frame structure is attached to the pump vault cover. The pump is connected to an aerator. Filter material adapted to remove debris from unfiltered water to obtain filtered water is arranged within the frame structure. The pump vault is covered with the pump vault cover such that the filter material is suspended within the pump vault and the unfiltered water passes through the filter material to obtain filtered water that enters the pump. The pump is operated such that the filtered water is reintroduced into the pond through the aerator. The filter material is removed for cleaning and/or replacement from the pump vault by lifting the pump vault cover and the frame structure attached thereto from the pump vault.

DETAILED DESCRIPTION OF THE INVENTION

Figure 1:
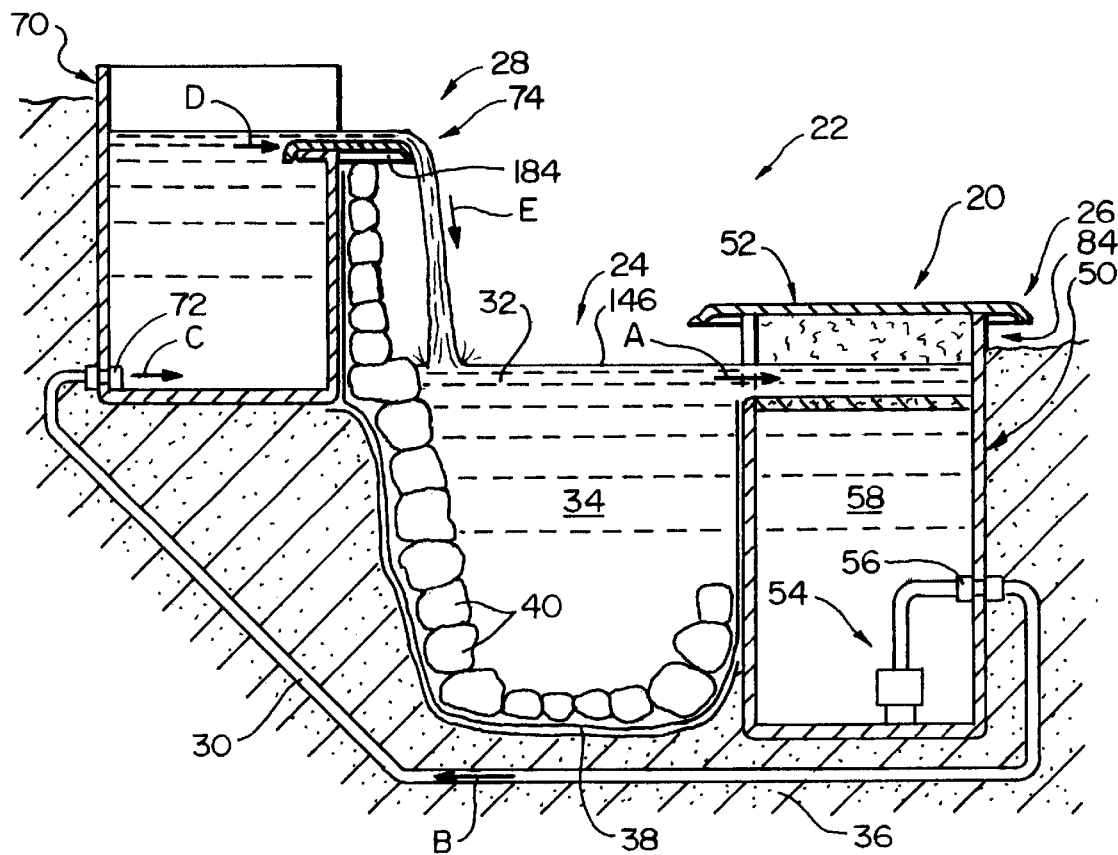
FIG. 1 is a side elevation section view depicting an exemplary pond system incorporating the principles of the present invention.

Referring initially to FIG. 1 of the drawing, depicted at 20 therein is a filter system constructed in accordance with, and embodying, the principles of the present invention. The filter system 20 is used in an exemplary pond system 22.

The pond system 22 comprises a pond 24, a pump system 26, an aerator system 28, and a connecting pipe 30. In general, the pump system 26 pumps filtered water to the aerator system 28 through the connecting pipe 30. The filtered water spills out of the aerator system 28 into the pond 24. Unfiltered pond water flows back into the pump system 26 through the filter system 20. The filter system 20 is designed to simplify the process of cleaning the filter system 20 of debris that the filter system 20 removes from the unfiltered water to obtain the filtered water. The filter system 20 and the interaction of this system 20 with the components of the pond system 22 will now be described in further detail.

The pond 24 includes water 32 that is contained by a pond cavity 34 in the earth 36. The pond cavity 34 is lined with a pond liner 38. Decorative elements such as rocks 40 may be placed in the pond cavity 34 on the liner 38.

The exemplary pump system 26 comprises a pump vault 50, a pump vault lid 52, a pump assembly 54, a pump vault fitting 56. The pump vault 50 defines a pump cavity 58 and is at least partly buried in the earth 36 adjacent to the pond cavity 34. The pond liner 38 extends along a portion of the pump vault 50. The pump vault lid 52 fits onto the pump vault 50 to inhibit access to the pump cavity 58. The pump assembly 54 is mounted within the pump cavity 58 and is operatively connected to the pump vault fitting 56.

The exemplary aerator system 28 comprises an aerator vault 70, an aerator vault fitting 72, and a waterfall ledge 74. The aerator vault 70 defines an aerator cavity 76 and is similar in construction to the pump vault 50. The aerator vault fitting 72 is formed in a lower portion of the aerator vault 70. The waterfall ledge 74 is rigidly connected to the aerator vault 70 such that water entering the aerator vault 70 through the aerator vault fitting 72 flows out of the aerator vault 70 over the waterfall ledge 74. The aerator vault 70 is at least partly embedded in the earth 36 adjacent to the pond 24 such that water flowing over the waterfall ledge 74 falls into the pond 24.

The connecting pipe 30 is connected at one end to the pump vault fitting 56 and at the other end to the aerator vault fitting 72. Operation of the pump assembly 54 thus causes the water 32 to recirculate along a closed flow path. In particular, the water 32 flows from the pond 24 into the pump cavity 58 along a flow path portion A, through the connecting pipe 30 along a flow path portion B, into the aerator cavity 76 along a flow path portion C, and onto the waterfall ledge 74 along a flow path portion D, at which point the water 32 falls back into the pond 24 along a flow path portion E.

Figure 4:
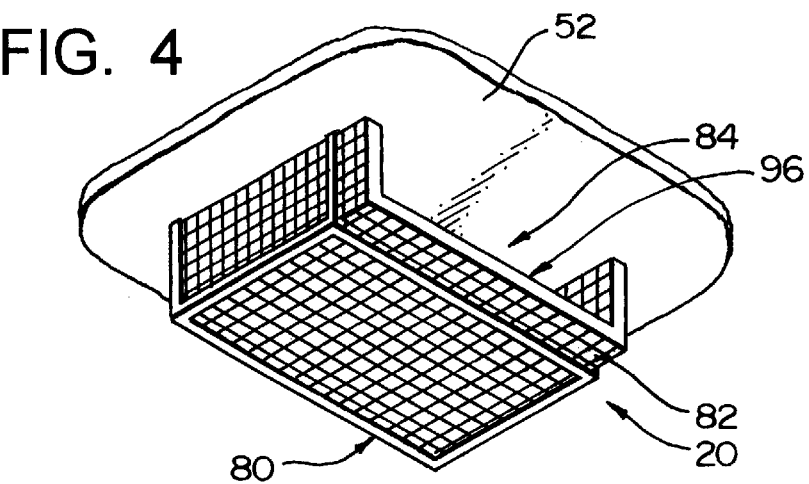
FIG. 4 is a perspective view of an exemplary pump vault lid incorporating an exemplary filter system incorporating the principles of the present invention.

Referring for a moment to FIG. 4, the filter system 20 is depicted therein in further detail. The filter system 20 comprises a frame structure 80 and filter material 82. The frame structure 80 is attached to the pump vault lid 52. The filter material 82 can be any material or structure capable of removing debris from the water flowing along the flow path portion A. Conventionally, the filter material is made of synthetic fibers loosely pressed and bonded into a mat; this mat of fibers defines a matrix of passageways through which water can flow but traps and prevents passage debris in the water. In the exemplary filter system 20, the filter material 82 is arranged in the shape of a shallow tray and inserted into a filter area 84 generally defined by the frame structure 80.

When the pump vault lid 52 is placed onto the pump vault 50, the frame structure 80 supports filter material 82 such that the water flowing along the flow path portion A must pass through the filter material 82 before reaching the pump assembly 54. The filter material 82 will thus prevent leaves and other debris floating in the pond 24 from reaching the pump assembly 54. The debris removed from the water 32 flowing along the flow path portion A will, however, accumulate in the filter material 82.

Accordingly, the filter material 82 will need to be removed and cleaned periodically to prevent restriction of the flow of water 32 along the flow path portion A. The filter system 20 greatly simplifies the process of removing and cleaning the filter material 82.

In particular, the pump vault lid 52 is simply removed from the pump vault 50; because the frame structure 80 is mounted to the pump vault lid 52 and the filter material 82 is supported by the frame structure 80, the filter material 82 is removed along with the pump vault lid 52. Once the pump vault lid 52 is removed, the filter material 82 is simply removed from the filter area 84 and cleaned with a hose or the like or replaced, as desired. The individual cleaning the filter material need not drain the pump vault or reach into the water within the pump vault to access the filter material.

Figure 5:
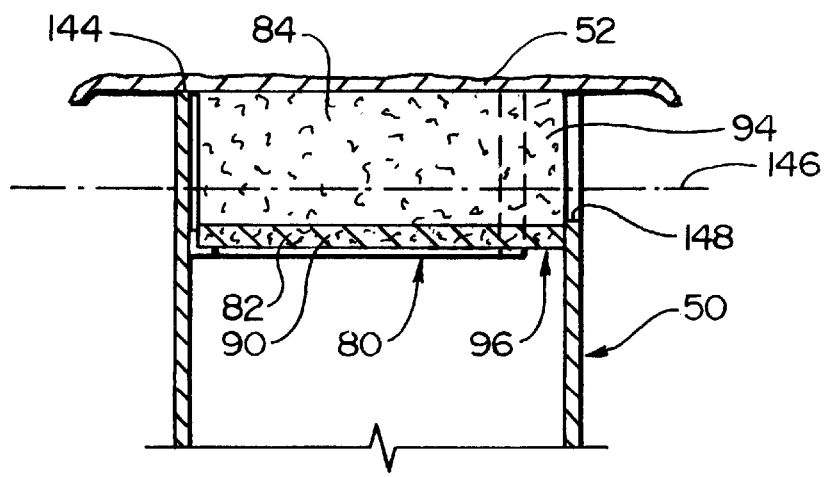
FIG. 5 is a side elevation section view depicting the interaction of the pump vault housing and pump vault lid of the system of FIG. 1.
Figure 6:
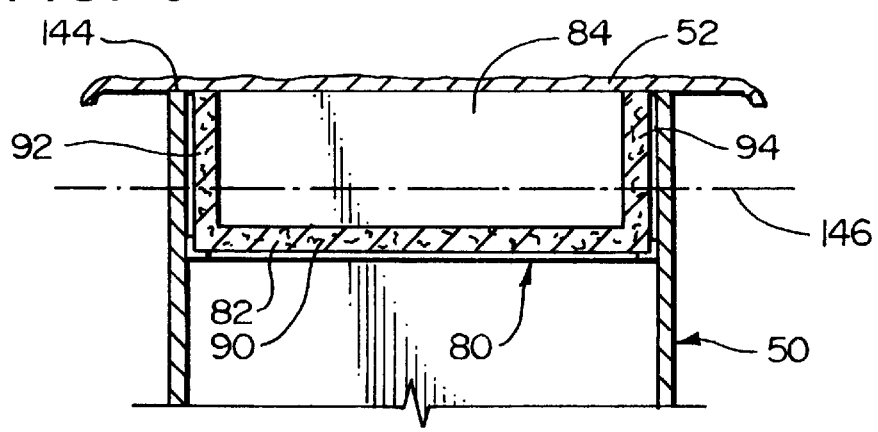
FIG. 6 is a front elevation section view depicting the interaction of the pump vault housing and pump vault lid of the system of FIG. 1.

FIGS. 5 and 6 illustrate that the exemplary filter material 82 is formed in a three walled shape having a bottom portion 90 and first and second side portions 92 and 94. FIGS. 1, 5, and 6 illustrate that the filter material 82 is arranged such that the substantially all of the unfiltered water passing through the pump cavity 58 to reach the pump assembly 54. FIGS. 4 and 5 illustrate that the filter area 84 defined by the frame structure 80 is slightly smaller than the filter material 82 such that an overhang portion 96 of the filter material 82 extends beyond the frame structure 80.

Referring now to FIGS. 2–6, the construction and operation of the pond system 22 will now be described in further detail.

Figure 3:
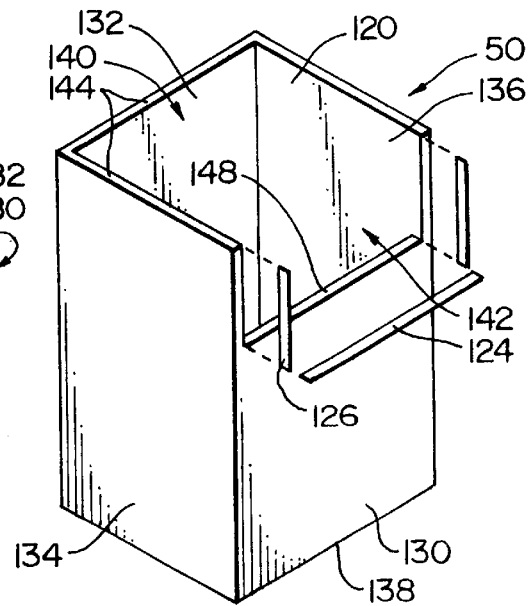
FIG. 3 is a perspective view of an exemplary pump vault housing that may be used in the system of FIG. 1.

Referring initially to FIG. 3, depicted therein is an exploded view depicting the exemplary pump vault 50. The pump vault 50 comprises a pump vault housing 120 and first, second, and third liner plates 122, 124, and 126. The pump vault housing 120 comprises front, back, left, right, and bottom walls 130, 132, 134, 136, and 138. An upper end 140 of the pump vault housing 120 is open, and the front wall 130 is shorter than the back and side walls 132–136 and thus defines an inlet opening 142.

In use, an upper edge 144 of the back and side walls 132–136 is spaced above a level 146 (FIGS. 1, 5, 6) of the water 32 and an upper edge 148 of the front wall 130 is spaced below the water level 146. The water 32 thus flows into the pump cavity 58 through the inlet opening 142.

The bottom portion 90 of the exemplary filter material 82 is arranged substantially below the upper edge 148 of the front wall 130 and extends from the front wall 130 to the rear wall 132 and from the first side wall 134 to the second side wall 136. The first and second side portions 92 and 94 extend upwardly along a portion of the first and second side walls 134 and 136, respectively, of the pump vault housing 120.

The geometry of the filter material 82 relative to the geometry of the pump vault housing 120, in combination with the fact that the frame structure 80 maintains the bottom portion 90 of the filter material 82 substantially below the upper edge 148 of the front wall 130, allows substantially all of the water entering the pump cavity 58 through the inlet opening 142 to pass through at least a portion of the filter material 82.

The pond liner 38 is originally laid such that it covers the inlet opening 142. The liner 38 is then cut along the outlines of the inlet opening 142 and folded into the pump cavity 58. The first, second, and third liner plates 122–126 are then attached to the pump vault housing 120 around the inlet opening 142 to secure the pond liner 38 to the pump vault housing 120. This attachment is preferably formed by gluing angle irons to the pump vault housing 120 and screwing the plates 122–126 to these angle irons.

Figure 2:
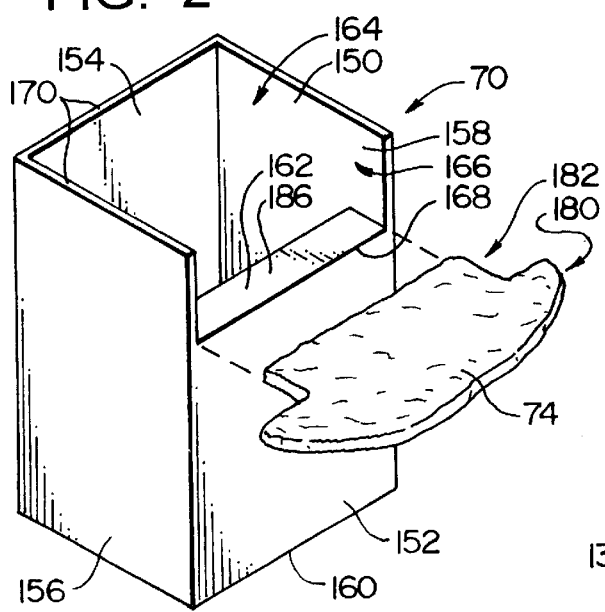
FIG. 2 is a perspective view of an exemplary aerator system that may be used in the system of FIG. 1.

Referring now to FIG. 2, depicted therein is the exemplary aerator system 28. The aerator vault 70 comprises an aerator vault housing 150 having front, back, left, right, bottom, and ledge walls 152, 154, 156, 158, 160, and 162. An upper end 164 of the aerator vault housing 150 is open, and the front wall 152 is shorter than the back and side walls 154–160 and thus defines an outlet opening 166. The ledge wall 162 is connected to an upper edge 168 of the front wall 152 and extends between the left and right walls 156 and 158.

The waterfall ledge 74 is securely fastened by gluing or the like to the ledge wall 162. In particular, the exemplary waterfall ledge 74 is a rigid member comprising a front portion 180 and rear portion 182. A shallow depression 184 (FIG. 1) is formed in the underside of the waterfall ledge 74. The front portion 180 will normally be in a shape, color, and texture that simulates the appearance of a flat rock. The rear portion 182 will be in a color and texture that simulates the appearance of rock, but will be shaped to extend over substantially the entire ledge wall 162, which is substantially rectangular in the exemplary aerator system 28. The ledge wall 162 is received by the shallow depression 184 to improve the connection between the ledge wall 162 and the waterfall ledge 74.

The upper edge 168 of the front wall 152 is lower than an upper edge 170 of the back and side walls 154–158. In addition, in use the aerator vault 70 is arranged such that the waterfall ledge 74 is above the level 146 of the water 32 and extends out over the water 32. Accordingly, water flowing into the aerator vault 70 through the aerator vault fitting 72 flows out of the aerator cavity 76 over an upper surface 186 of the waterfall ledge 74 and falls into the water 32 in the pond 24.

Given the foregoing detailed description of the present invention, it should be clear that the present invention may be modified in forms different from the exemplary embodiment described above.

The filter system 20 was described in the context of a single stage filtration system adapted to remove relatively large floating or suspended debris from the water entering the pump assembly 52. Alternatively, this exemplary filtration system may be replaced by a filter system that removes other impurities such as relatively small suspended debris or chemical, biological, or mineral impurities from the water flowing through the system 20.

The filter system 20 may also be implemented as a multi-stage system that removes one or more impurities, such as relatively large floating debris, relatively small suspended debris, chemical impurities, biological impurities, and/or mineral impurities. The second filter stage may be integrated with a filter material such as the filter material 82 described above, or may be a separate layer or separate layers of material. Should a separate layer or separate layers of materials be used, the frame structure 80 may include multiple filter areas such as the filter area 84 described above, one filter area for each layer of filter material used to implement the multi-stage filtration system. In a multi-stage filter environment, each of these separate filter stages may be removed, replaced, and/or cleaned simply by removing the pump vault lid 52 as described above. Filters may also be provided at additional locations in the pond system 22 such as in the aerator cavity 76.

In addition, the aerator system 28 may be implemented in a manner different from that described herein. In particular, the aerator system 28 of the pond system 22 may take the form of a fountain or statue through which water is forced back into the water 32 of the pond 24.

Accordingly, the present invention may be embodied in forms other than the exemplary preferred embodiment described above, and the scope of the present invention should be determined by the claims appended hereto and not the foregoing detailed description.

I claim:

1. A pond system comprising:
   a pond;
   a pump vault arranged such that unfiltered water in the pond flows into the pump vault;
   a pump arranged within the pump vault;
   a pump vault cover adapted to cover the pump vault, where the pump vault cover is above a water level of the pond when the pump vault cover covers the pump vault; and
   a filter system comprising
      filter material adapted to remove debris from unfiltered water to obtain filtered water, and
      a frame structure connected to the pump vault cover for suspending the filter material within the pump vault below the water level of the pond such that unfiltered water first passes through the filter material before entering the pump, where the filter material is removed from the pump vault by removing the pump vault cover from the pump vault.

2. A pond system as recited in claim 1, further comprising an aerator operatively connected to the pump such that water is directed from the pump into the pond through the aerator.

3. A pond system as recited in claim 1, in which the filter means comprises a fiber mat.

4. A pond system as recited in claim 1, in which, when the pump vault lid is mounted on the pump vault, the frame structure extends into a pump cavity defined by the pump vault.

5. A pond system as recited in claim 1, in which, when the pump vault lid is mounted on the pump vault, the frame structure maintains the filter material below a surface of water within the pond.

6. A pond system as recited in claim 1, in which, when the pump vault lid is mounted on the pump vault, the frame structure extends into a pump cavity defined by the pump vault such that the frame structure maintains the filter material below a surface of water within the pond.

7. A pond system as recited in claim 1, in which the frame structure supports a plurality of filter materials.

8. A pond system as recited in claim 1, in which the frame structure supports the filter material such that substantially all water entering the pump passes through the filter material.

9. A pond system as recited in claim 1, in which the frame structure defines a filter area into which the filter material is inserted.

10. A pond system as recited in claim 1, in which the frame structure supports the filter material such at least an overhang portion of the filter material extends beyond the filter area.

11. A method of filtering water in a pond, comprising the steps of:
    arranging a pump vault adjacent to the pond such that unfiltered water within the pond enters the pump vault;
    arranging a pump within the pump vault;
    providing a pump vault cover;
    attaching a frame structure to the pump vault cover;
    operatively connecting the pump to an aerator;
    providing filter material adapted to remove debris from unfiltered water to obtain filtered water;
    arranging the filter material within the frame structure;
    covering the pump vault with the pump vault cover such that the pump vault cover is above a water level of the pond, the filter material is suspended within the pump vault below the water level of the pond, and the unfiltered water passes through the filter material to obtain filtered water that enters the pump;
    operating the pump such that the filtered water is reintroduced into the pond through the aerator; and
    removing the filter material from the pump vault by lifting the pump vault cover and the frame structure attached thereto from the pump vault.

* * * * *